US010965145B2

(12) United States Patent
Suzuki et al.

(10) Patent No.: US 10,965,145 B2
(45) Date of Patent: Mar. 30, 2021

(54) CHARGE CONTROL DEVICE, CHARGING SYSTEM, AND CHARGE CONTROL METHOD

(71) Applicants: Daisuke Suzuki, Tokyo (JP); Takafumi Goto, Tokyo (JP); Kensuke Kuroda, Tokyo (JP)

(72) Inventors: Daisuke Suzuki, Tokyo (JP); Takafumi Goto, Tokyo (JP); Kensuke Kuroda, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 125 days.

(21) Appl. No.: 16/213,026

(22) Filed: Dec. 7, 2018

(65) Prior Publication Data
US 2019/0252905 A1    Aug. 15, 2019

(30) Foreign Application Priority Data

Feb. 9, 2018    (JP) .............................. JP2018-022014

(51) Int. Cl.
| H02J 7/06 | (2006.01) |
| H02J 7/04 | (2006.01) |
| H02J 7/02 | (2016.01) |

(52) U.S. Cl.
CPC .............. *H02J 7/045* (2013.01); *H02J 7/027* (2013.01); *H02J 7/06* (2013.01)

(58) Field of Classification Search
CPC .. H02J 7/06; H02J 2207/20; H02J 7/02; H02J 7/0036; H02J 7/0034; H02J 7/045;
(Continued)

(56) References Cited

U.S. PATENT DOCUMENTS 5,986,437 A * 11/1999 Lee ........................... G06F 1/26
                                                      320/162
7,834,591 B2 * 11/2010 Hussain ................ H01M 10/44
                                                      320/137
(Continued)

FOREIGN PATENT DOCUMENTS

| JP | 2000-060015 | 2/2000 |
| JP | 2000-195563 | 7/2000 |

(Continued)

OTHER PUBLICATIONS

Japanese Decision of Refusal for 2018-022014 dated Apr. 23, 2019.
(Continued)

*Primary Examiner* — Nghia M Doan
(74) *Attorney, Agent, or Firm* — IPUSA, PLLC (57) ABSTRACT

A charge control device for controlling charging of a secondary battery by using a current limit function of an external power supply includes: a charge control element arranged to be connected in series between the external power supply and the secondary battery; a constant current control unit configured to control an output current of the charge control element to be constant; a constant voltage control unit configured to control an output voltage of the charge control element to be constant; and an ON state setting unit configured to set the charge control element to an ON state, wherein the charge control element includes a control terminal to which a control signal for controlling the output current and the output voltage is input, and is composed of a single output element.

7 Claims, 9 Drawing Sheets

(58) Field of Classification Search
CPC ...... H02J 7/027; H02J 7/00714; H02J 7/0071; H02J 7/007192; H02J 7/007182; H02J 7/0072; H01M 10/44; Y02E 60/10
See application file for complete search history.

(56) References Cited

U.S. PATENT DOCUMENTS

| | | | |
|---|---|---|---|
| 7,880,445 B2 * | 2/2011 | Hussain | H02J 7/0071 320/164 |
| 8,258,750 B2 * | 9/2012 | Yamada | H02J 7/0071 320/128 |
| 2002/0097022 A1 * | 7/2002 | Saeki | H02J 7/045 320/125 |
| 2004/0095095 A1 * | 5/2004 | Yamamoto | H02J 7/045 320/128 |
| 2008/0197804 A1 | 8/2008 | Onishi et al. | |
| 2009/0302805 A1 | 12/2009 | Motoichi et al. | |

FOREIGN PATENT DOCUMENTS

| | | |
|---|---|---|
| JP | 2004-159477 | 6/2004 |
| JP | 2007-110820 | 4/2007 |
| JP | 2008-206232 | 9/2008 |
| JP | 2009-296817 | 12/2009 |

OTHER PUBLICATIONS

Japanese Reconsideration Report by Examiner before Appeal for 2018-022014 dated Aug. 27, 2019.

* cited by examiner

CHARGE CONTROL DEVICE, CHARGING SYSTEM, AND CHARGE CONTROL METHOD

CROSS-REFERENCE TO RELATED APPLICATION

The present application is based on and claims priority to Japanese Application No. 2018-022014 filed on Feb. 9, 2018, the entire contents of which are hereby incorporated by reference.

BACKGROUND OF THE INVENTION

1. Field of the Invention

The present invention relates to a charge control device, a charging system, and a charge control method.

Figure 1:
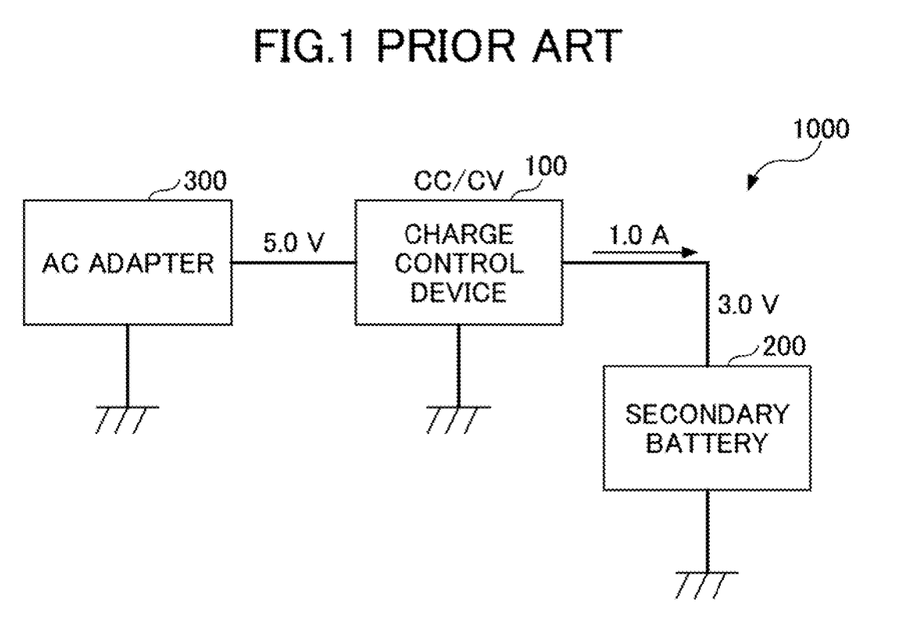
FIG. 1 is a diagram illustrating an example of a configuration of a conventional charging system.

FIG. 1 is a diagram illustrating an example of a configuration of a conventional charging system 1000. The charging system 1000 includes an AC adapter 300 that converts AC power into DC power and to output the DC power, a secondary battery 200 such as a lithium ion battery, and a charge control device 100 that controls charging of the secondary battery 200 based on the DC power output from the AC adapter 300.

When the charge control device 100 CC (Constant Current)-charges or CV (Constant Voltage)-charges the secondary battery 200 in a linear charging method, a large part of the power consumption of the charge control device 100 is $\Delta V \times Ic$. $\Delta V$ represents an electric potential difference between an input voltage that is input from the AC adapter 300 to the charge control device 100 and an output voltage that is output from the charge control device 100 to the secondary battery 200. Ic represents a charging current that is output from the charge control device 100 to the secondary battery 200.

Note that Patent Documents 1, 2, and 3 are prior art documents that describe charging of secondary batteries, for example.

RELATED-ART DOCUMENTS

Patent Documents

[Patent Document 1] Japanese Laid-open Patent Publication No. 2000-060015
[Patent Document 2] Japanese Laid-open Patent Publication No. 2000-195563
[Patent Document 3] Japanese Laid-open Patent Publication No. 2009-296817

Figure 2:
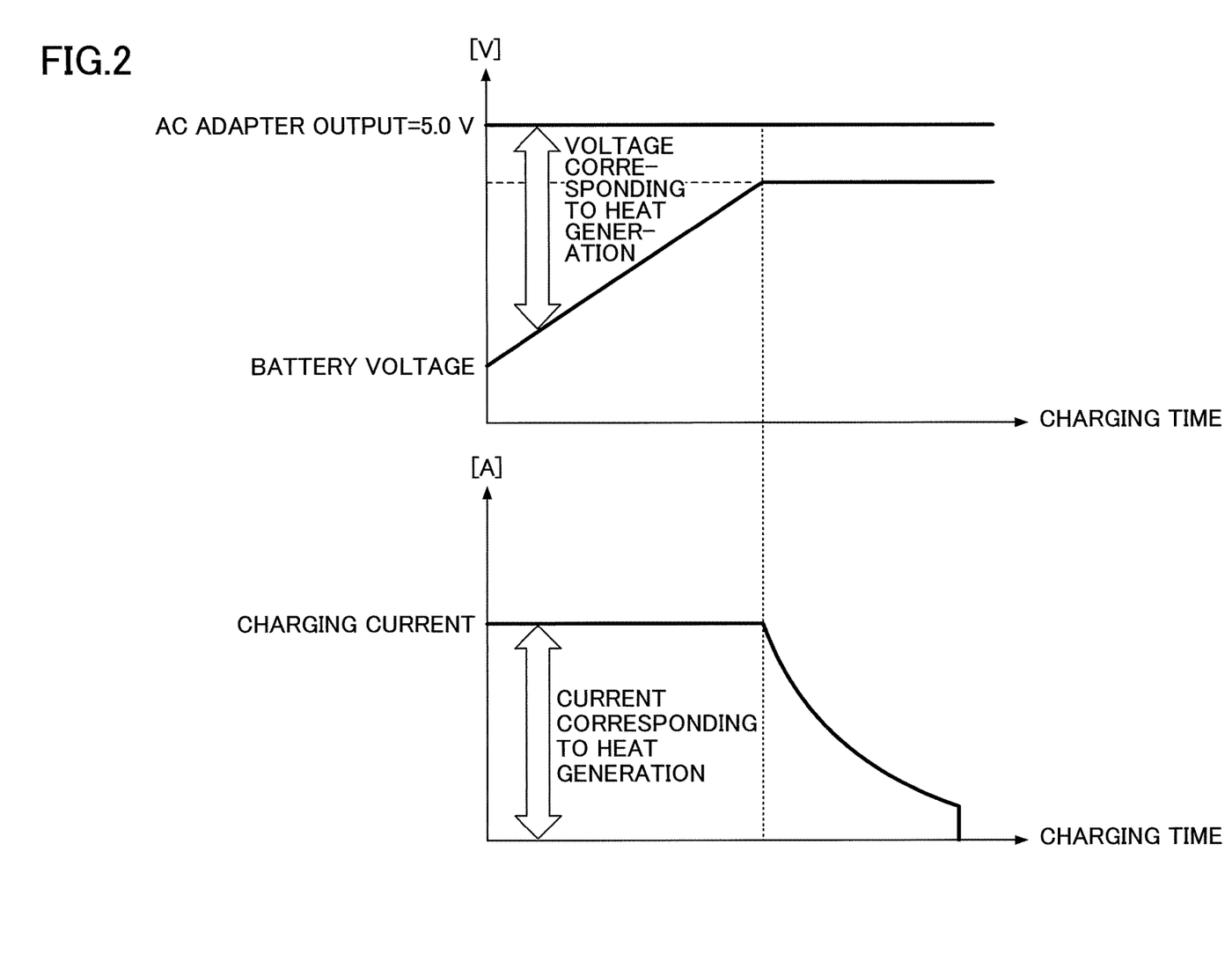
FIG. 2 is a timing chart illustrating an example of a charging operation that is performed in a conventional charging system.

However, in such a conventional technique, when a secondary battery is charged with a relatively large current in a linear charging method in order to shorten the charging time, the power consumption of the charge control device may be excessive. For example, as illustrated in FIG. 1 and FIG. 2, in a case of lowering the output voltage 5.0 V of the AC adapter 300 to charge the secondary battery 200 whose battery voltage is 3.0 V, when the charging current is set to be at a relatively large value of 1.0 A in order to shorten the charging time, the power consumption of the charge control device 100 is approximately 2.0 W. This power consumption value may exceed the allowable power dissipation at the time of mounting an IC (Integrated Circuit).

Therefore, the present disclosure provides a technique capable of suppressing the power consumption of a charge control device even when a secondary battery is charged with a relatively large current.

SUMMARY OF THE INVENTION

The present disclosure provides a charge control device for controlling charging of a secondary battery by using a current limit function of an external power supply, the charge control device including: a charge control element arranged to be connected in series between the external power supply and the secondary battery; a constant current control unit configured to control an output current of the charge control element to be constant; a constant voltage control unit configured to control an output voltage of the charge control element to be constant; and an ON state setting unit configured to set the charge control element to an ON state, wherein the charge control element includes a control terminal to which a control signal for controlling the output current and the output voltage is input, and is composed of a single output element.

Also, the present disclosure provides a charging system including: a secondary battery; an external power supply having a current limit function; and a charge control device configured to control charging of the secondary battery by using the current limit function, wherein the charge control device includes a charge control element connected in series between the external power supply and the secondary battery; a constant current control unit configured to control an output current of the charge control element to be constant; a constant voltage control unit configured to control an output voltage of the charge control element to be constant; and an ON state setting unit configured to set the charge control element to an ON state, wherein the charge control element includes a control terminal to which a control signal for controlling the output current and the output voltage is input, and is composed of a single output element.

Also, the present disclosure provides a charge control method for controlling charging of a secondary battery by using a current limit function of an external power supply, the method including: controlling an output current of a charge control element, which is arranged to be connected in series between the external power supply and the secondary battery, to be constant;
controlling an output voltage of the charge control element to be constant; and setting the charge control element to an ON state, wherein the charge control element includes a control terminal to which a control signal for controlling the output current and the output voltage is input, and is composed of a single output element.

Advantageous Effects of Invention

According to the present disclosure, it is possible to suppress the power consumption of a charge control device even when a secondary battery is charged with a relatively large current.

DETAILED DESCRIPTION OF THE EMBODIMENTS

Hereinafter, an embodiment of the present disclosure will be described with reference to the drawings. First, variations of output properties of external power supplies such as AC adapters will be described.

Figure 3:
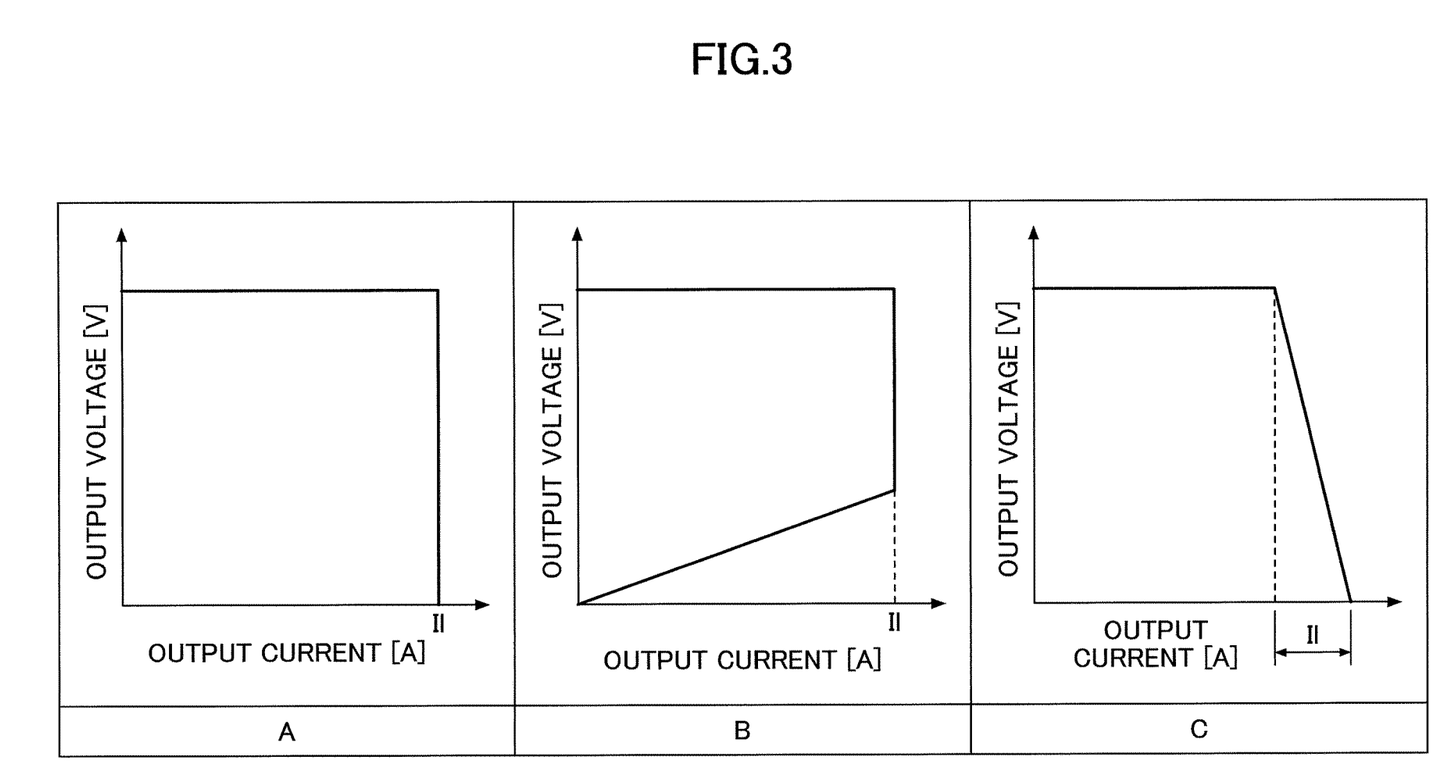
FIG. 3 is a diagram illustrating variations of output properties of external power supplies such as AC adapters.

FIG. 3 is a diagram illustrating variations of output properties of external power supplies such as AC adapters. For, the output properties of external power supplies such as AC adapters, there are types such as A, B, and C. In the external power supplies having such output properties, upon an output current reaching a current limit I1, an overcurrent protection function for limiting the output current operates.

The output property A represents a dropping property in which, when the output current tries to flow beyond a predetermined current value (current limit I1) while the output voltage is at a predetermined voltage value, the output voltage decreases while the output current remains at a constant current value (current limit I1). The output property B represents a fold-back property in which, when the output current tries to flow beyond a predetermined current value (current limit I1) while the output voltage is at a predetermined voltage value, the output voltage decreases together with the output current. The output property C represents a property in which, when the output current tries to flow beyond a certain current value (lower limit of the current limit I1) while the output voltage is at a predetermined voltage value, the output voltage decreases while allowing the output current to flow as much as possible.

As described above, an external power supply having any output property has a current limit function by which the output voltage decreases when an electric current equal to or greater than (the lower limit of) the current limit I1 is pulled by an output side load of the external power supply. Note that the "current limit function" includes, even if a current limit is not provided intentionally (in design), a case in which the output voltage decreases when the output current flows beyond a certain current value due to a circuit configuration (such as a case of the output property C, for example).

Figure 4:
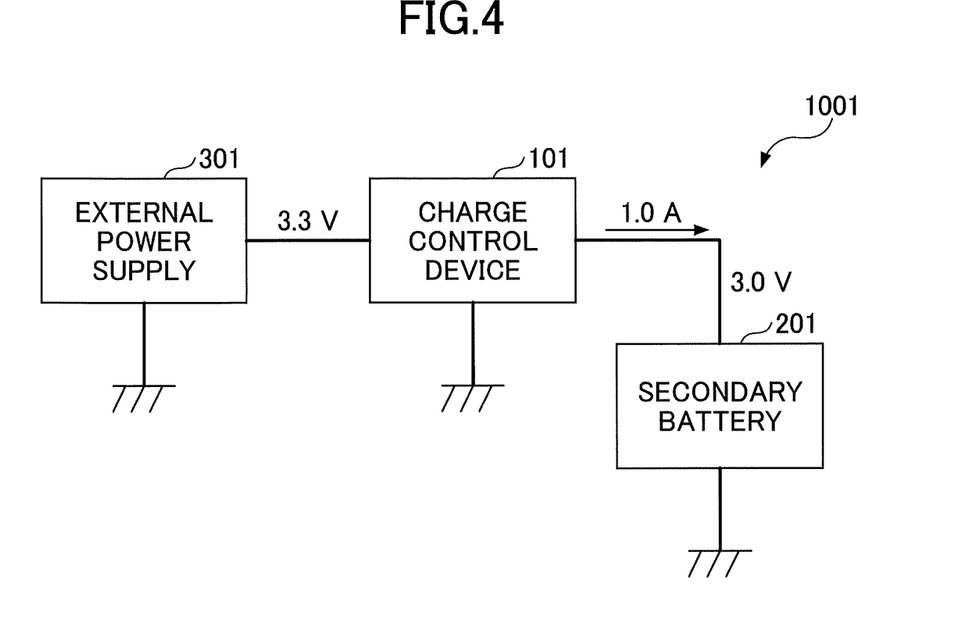
FIG. 4 is a diagram illustrating an example of a configuration of a charging system according to the present embodiment.
Figure 5:
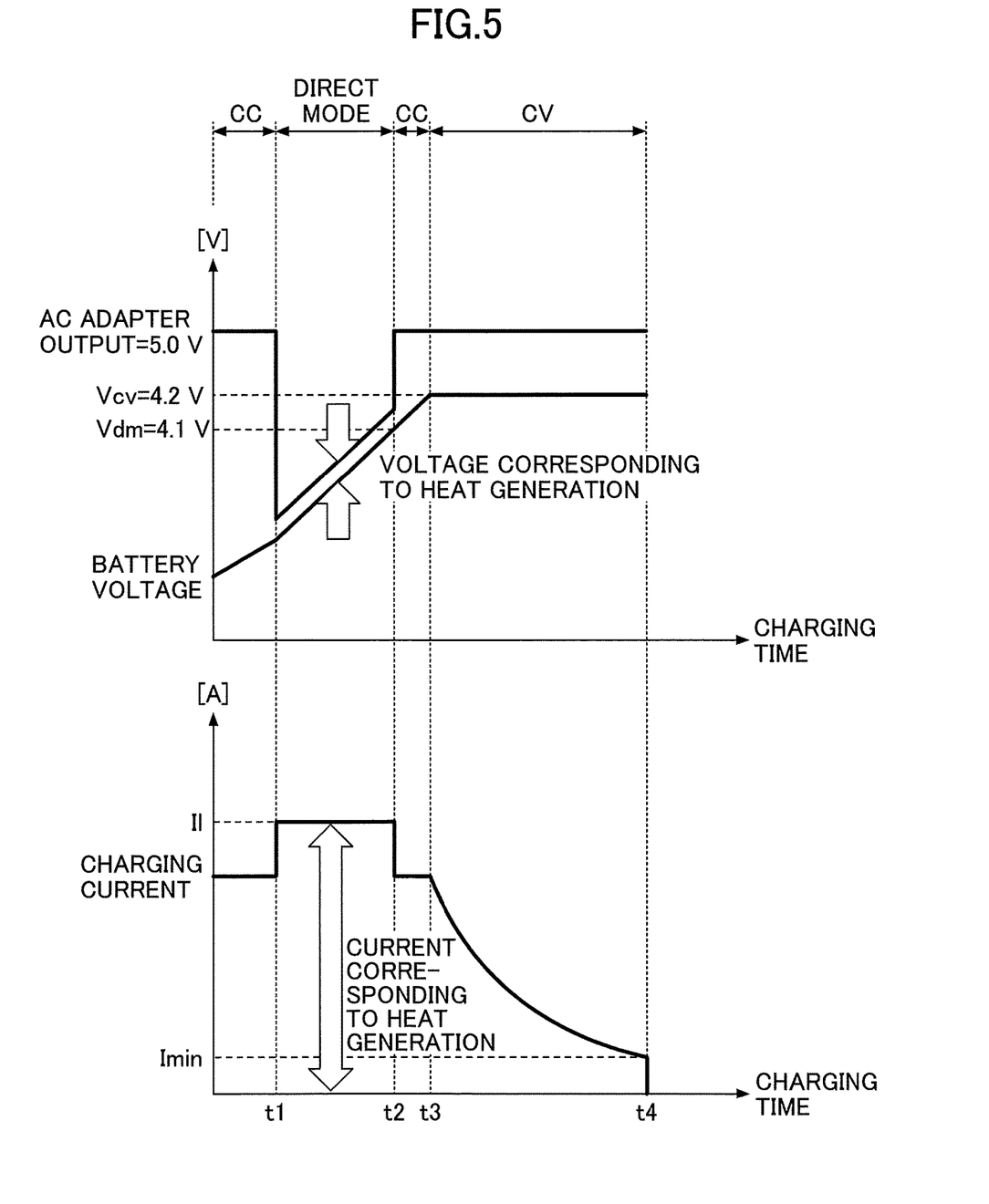
FIG. 5 is a timing chart illustrating an example of a charging operation that is performed in the charging system according to the present embodiment.

Therefore, the charge control device 101 according to the present embodiment that is illustrated in FIG. 4 uses the current limit function, which the external power supply 301 such as an AC adapter has, to cause an input voltage (the output voltage of the external power supply 301) input to the charge control device 101 to follow the battery voltage as illustrated in FIG. 5. As a result, even when a secondary battery 201 is charged with a relatively large charging current, the power consumption of the charge control device 101 can be reduced.

Specifically, the charge control device 101 includes a charge control transistor connected in series between an external power supply 301 and the secondary battery 201, and operates in an operation mode (direct mode) in which the charge control transistor is turned on. Accordingly, because the external power supply 301 and the secondary battery 201 are connected with low resistance (that is, the on resistance of the charge control transistor), it is possible to draw out the charging current from the external power supply 301 to the current limit set in advance in the external power supply 301. At this time, the upper limit value for the specification of the charging current when charging the secondary battery 201 is required to exceed the value of the current limit of the external power supply 301. Therefore, it is necessary to set in advance the consistency of the output current capability of the external power supply 301 with the charging specification of the secondary battery 201.

Ideally, it is desirable to charge a secondary battery using a dedicated external power supply with a predetermined constant current capability. However, when USB (Universal Serial Bus) connectors are adopted, there may be a case where an external power supply having a specification different from a dedicated external power supply is connected to the input side of the charge control device 101 on the market. Therefore, as a protective function, the charge control device 101 may have a current limiting function to limit the output current upon an input current exceeding a prescribed value, or may have a temperature limiting function to limit the output current upon the temperature exceeding a prescribe value.

Next, with reference to FIGS. 4 and 5, a configuration and a charging operation of a charging system 1001 according to the present embodiment will be described.

FIG. 4 is a diagram illustrating an example of the configuration of the charging system 1001 according to the present embodiment. The charging system 1001 that is illustrated in FIG. 4 includes the external power supply 301 such as an AC adapter, the secondary battery 201 such as a lithium ion battery, and the charge control device 101 that controls charging of the secondary battery 201 based on DC power that is output from the external power supply 301.

Using the external power supply 301 to which the current limit is applied at a predetermined current value, the charge control device 101 operates in a direct mode for rapidly charging the secondary battery 201 in a state of turning on the charge control transistor connected in series between the external power supply 301 and the secondary battery 201. When the charge control device 101 charges the secondary battery 201 in the direct mode, the current limit function of the external power supply 301 operates. In a state in which the current limit function operates, the output current (charging current) of the external power supply 301 rises to the current limit I1 while the output voltage output from the external power supply 301 decreases to a voltage that is slightly higher than the battery voltage of the secondary battery 201. That is, when the charge control device 101 charges the secondary battery 201 in the direct mode, the voltage ΔV between the input and output of the charge control device 101 having the charge control transistor incorporated therein (that is, the difference between the output voltage of the external power supply 301 and the output voltage of the secondary battery 201) decreases as illustrated in FIG. 5. ΔV corresponds to the product of the value of the current limit I1 of the charging current and the value of the ON resistance of the charge control transistor (that is, the voltage drop of the ON resistance of the charge control transistor).

For example, when the charge control device 101, in which a charge control transistor having an on-resistance of 300 mΩ is built, charges the secondary battery 201 in the direct mode using the external power supply 301 that is subject to a current limit at 1.0 A, the power consumption of the charge control device 101 is 300 mW. Even when the charging current is the same at 1.0 A, this power consumption is significantly lower than that of a conventional example as illustrated in FIG. 1 and FIG. 2, and is generally a value not exceeding the allowable power dissipation of an IC in the mounted state.

Because the power consumption generated by a linear charging method using a direct mode depends on the ON resistance of a charge control transistor, the flowing charging current increases, but the voltage between the input and the output of the charge control device 101 decreases. Therefore, as the ON resistance of the charge control transistor decreases, the power consumption of the charge control device 101 can be further suppressed.

Next, a configuration and a charge control operation of the charging system 1001 according to the present embodiment will be described in more detail.

Figure 6:
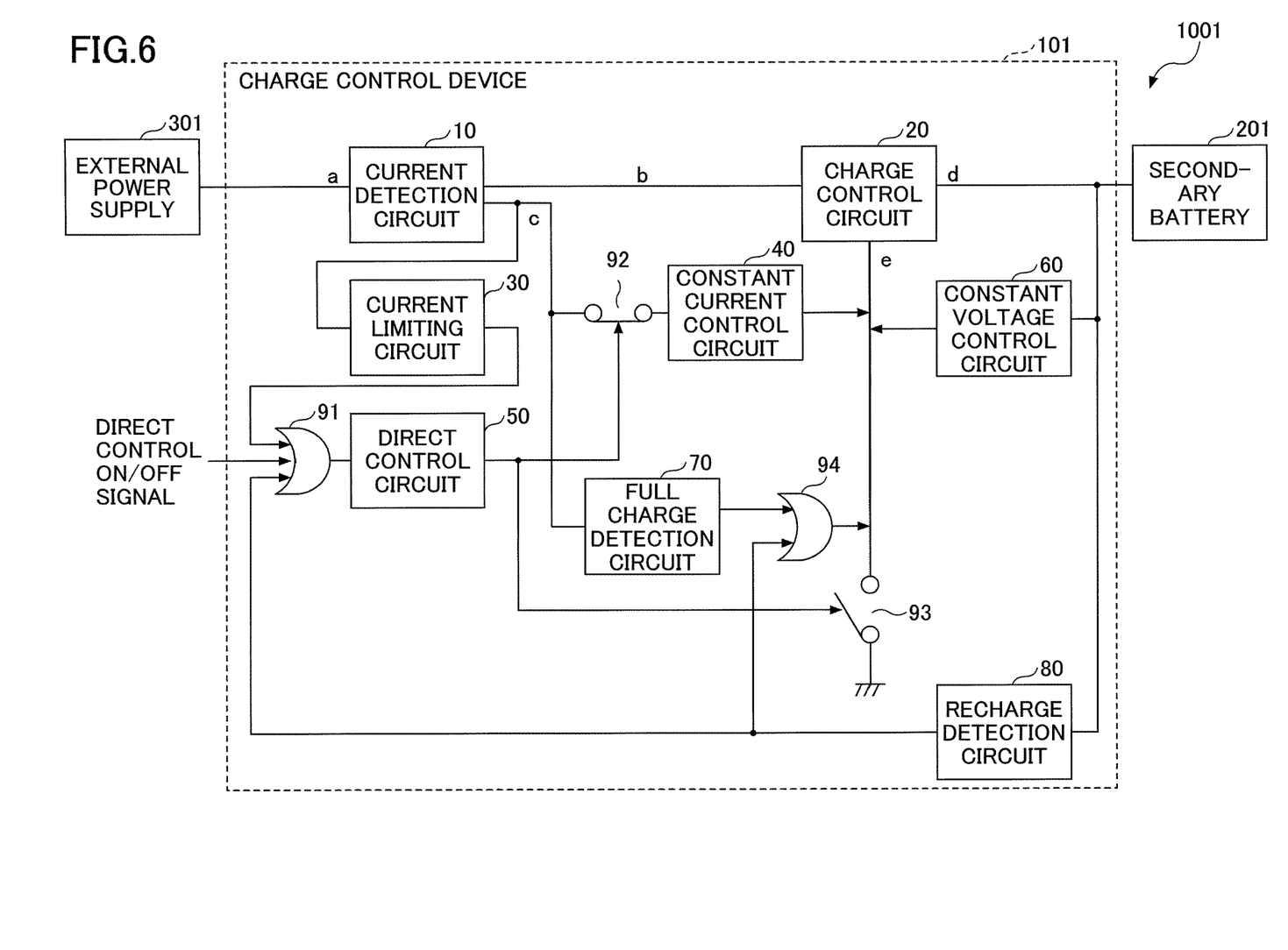
FIG. 6 is a diagram illustrating an example of the configuration of the charging system according to the present embodiment in more detail.

FIG. 6 is a diagram illustrating an example of the configuration of the charging system 1001 according to the present embodiment in more detail. The charging system 1001 includes the external power supply 301, the secondary battery 201, and the charge control device 101.

The external power supply 301 is a device that outputs DC power based on DC power or AC power. Specific examples of the external power supply 301 include a USB device, an AC adapter, and the like.

The secondary battery 201 is a rechargeable battery. Specific examples of the secondary battery 201 include, but are not limited to, a lithium ion battery and the like.

The charge control device 101 is an integrated circuit (IC) that controls charging of the secondary battery 201 using the current limit function of the external power supply 301. The charge control device 101 includes a current detection circuit 10, a charge control circuit 20, a current limiting circuit 30, a constant current control circuit 40, a direct control circuit 50, a constant voltage control circuit 60, a full charge detection circuit 70, and a recharge detection circuit 80.

The current detection circuit 10 detects the current value of an input current that is input from the external power supply 301 to the charge control device 101 and outputs the detection result to the current limiting circuit 30, the constant current control circuit 40, and the full charge detection circuit 70. The current detection circuit 10 is arranged to be connected in series between the external power supply 301 and the charge control circuit 20.

Figure 7:
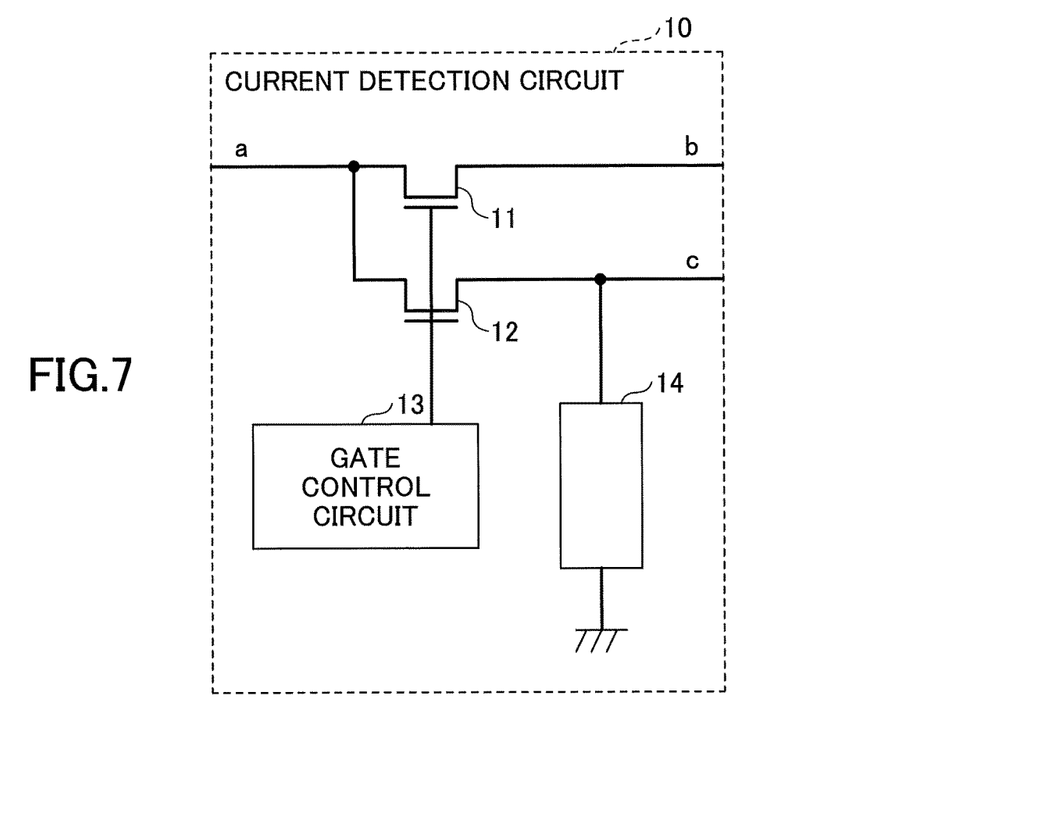
FIG. 7 is a diagram illustrating an example of a configuration of a current detection circuit.

FIG. 7 is a diagram illustrating an example of a configuration of the current detection circuit 10. Here, a, b, and c indicate the corresponding locations between FIG. 6 and FIG. 7. The current detection circuit 10 includes a transistor 11 through which a charging current flows, a transistor 12 whose size is smaller than that of the transistor 11, a gate control circuit 13 that controls the respective gates of the transistors 11 and 12, and a resistor 14 that is connected to the transistor 12. The transistors 11 and are, for example, P-channel MOSFETs (Metal Oxide Semiconductor Field Effect Transistors). The transistors 11 and 12 constitute a current mirror. The gate control circuit 13 completely turns on the transistors 11 and 12 during the direct mode. In addition, at the time of normal charging, the gate control circuit 13 operates the transistors 11 and 12 in a saturated area (state in which the ON resistance is high).

In a case where the size ratio (mirror ratio) of the transistor 11 to the transistor 12 is N:1 (N is a positive number greater than 1), an electric current that is 1/N of the charging current flowing from the external power supply 301 to the transistor 11 is output from the transistor 12. The current output from the transistor 12 is converted into a voltage by the resistor 14. That is, the current detection circuit 10 that is illustrated in FIG. 7 outputs the current detection voltage corresponding to the current value of the charging current input from the external power supply 301 to the charge control circuit 20.

Figure 8:
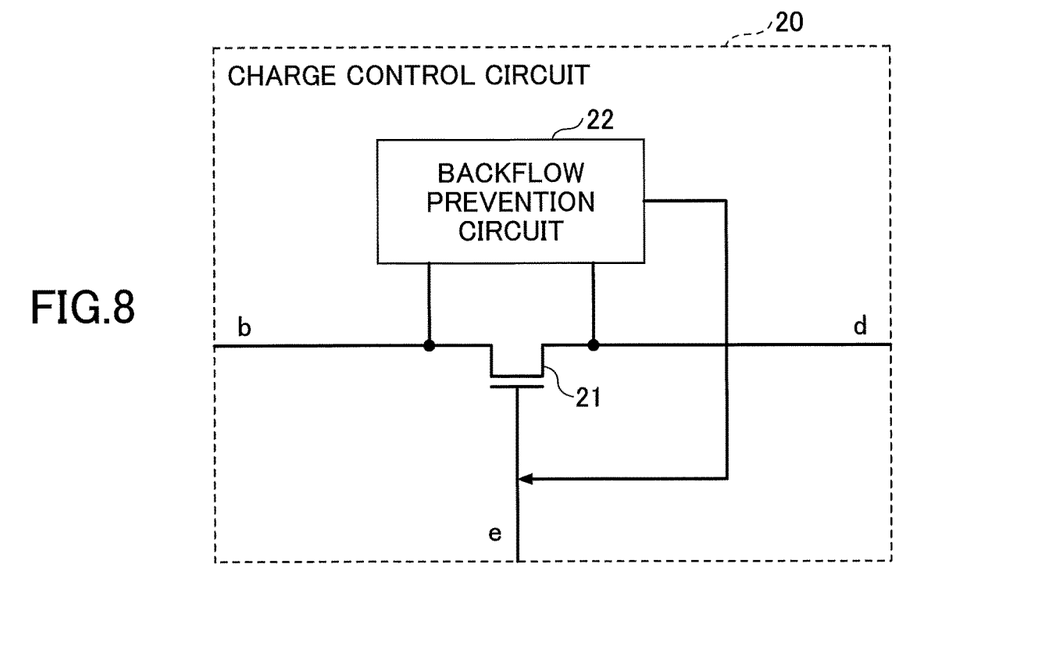
FIG. 8 is a diagram illustrating an example of a configuration of a charge control circuit.

FIG. 8 is a diagram illustrating an example of the configuration of the charge control circuit 20. Here, b, d, and e indicate the corresponding locations between FIG. 6 and FIG. 8. The charge control circuit 20 includes a charge control transistor 21 and a backflow prevention circuit 22.

The charge control transistor 21 is an example of a charge control element arranged to be connected in series between the external power supply 301 and the secondary battery 201, and is constituted by a single output element. Specific examples of the charge control transistor 21 include a P channel type MOSFET. In a case where the charge control transistor 21 is of a P-channel type, the source is connected to the external power supply 301 side, the drain is connected to the secondary battery 201 side, and the gate is connected to the ground via a switch 93 (see FIG. 6). The gate of the charge control transistor 21 is a control terminal to which a control signal for controlling the output current and the output voltage of the charge control transistor 21 is input.

The backflow prevention circuit 22 prevents an electric current from flowing from the secondary battery 201 via the charge control transistor 21 to the external power supply 301. The backflow prevention circuit 22 is configured to set the charge control transistor 21 to the OFF state to prevent backflow immediately before the output voltage on the "d" side becomes higher than the input voltage on the "b" side (for example, see Patent Document 3). Note that "immediately before the output voltage on the d side becomes higher than the input voltage on the b side" may be, for example, "when the difference between the output voltage on the d side becomes higher than the input voltage on the b side approaches to 30 mV".

In FIG. 6, the charge control device 101 has at least three charging modes that are a constant current mode, a constant voltage mode, and a direct mode. In each charging mode, the charge control device 101 outputs a charging current for charging the secondary battery 201 from the single charge control transistor 21 in the charge control circuit 20. Because charging currents that are used in different charging modes are not output from different transistors but output from the single charge control transistor 21, it is possible to reduce the size of the charge control device 101.

The constant current mode is a charging mode in which a constant charging current flows from the external power supply 301 to the secondary battery 201, and is controlled by the constant current control circuit 40. The constant voltage mode is a charging mode for suppressing the charging current so that the battery voltage of the secondary battery 201 does not exceed a constant voltage (constant voltage control voltage), and is controlled by the constant voltage control circuit 60. The direct mode is a charging mode of flowing a charging current for quickly charging the secondary battery 201 by using the current limit function of the external power supply 301 by setting the charge control transistor 21 to the ON state, and is controlled by the direct control circuit 50.

The constant current control circuit 40 is an example of a constant current control unit that performs constant current control to control the output current of the charge control transistor 21 to be constant at a constant current target value, and controls CC-charging to control the secondary battery 201 by constant current (that is, the constant current target value). For example, the constant current control circuit 40 adjusts the gate voltage of the charge control transistor 21 based on the charging current value detected by the current detection circuit 10 so that the output current output from the drain of the charge control transistor 21 to the secondary battery 201 matches the constant current target value. That is, the constant current control circuit 40 supplies a control signal for controlling the output current of the charge control transistor 21 to the gate of the charge control transistor 21.

The constant voltage control circuit 60 is an example of a constant voltage control unit that performs constant voltage control to control the output voltage of the charge control transistor 21 to be constant at a constant voltage control voltage, and controls CV-charging to control the secondary battery 201 by constant voltage (that is, the constant voltage control voltage). For example, the constant voltage control circuit 60 adjusts the gate voltage of the charge control transistor 21 based on the output voltage detected from the drain of the charge control transistor 21 so that the output voltage output from the drain of the charge control transistor 21 matches the constant voltage control voltage. That is, the constant voltage control circuit 60 supplies a control signal for controlling the output voltage of the charge control transistor 21 to the gate of the charge control transistor 21. Note that the output voltage detected from the drain of the charge control transistor 21 is substantially equal to the battery voltage of the secondary battery 201.

The feedback loop of the constant current control by the constant current control circuit 40 and the feedback loop of the constant voltage control by the constant voltage control circuit 60 simultaneously operate and switch automatically depending on wiring impedance, and the like. Specifically, the constant current control and the constant voltage control are not executed at the same time, but either one is always executed.

The current limiting circuit 30 determines whether a charging current value detected by the current detection circuit 10 is greater than a predetermined overcurrent detection value. When it is detected that the charging current is greater than the predetermined overcurrent detection value, the current limiting circuit 30 outputs an overcurrent detection signal that representing that the charging current is excessive. The overcurrent detection signal is input to the direct control circuit 50 via the OR circuit 91. Because the overcurrent detection value is set higher than the constant current target value, the overcurrent detection signal is not output during the constant current mode in which the constant current control circuit 40 controls the output current of the charge control transistor 21 to be at a constant current.

The direct control circuit 50 is an example of an ON state setting unit that sets the charge control transistor 21 to an ON state, and performs control to charge the secondary battery 201 in the direct mode by using the current limit function of the external power supply 301. For example, by setting the switch 93 to the ON state, the direct control circuit 50 sets the charge control transistor 21 to the ON state.

The direct control circuit 50 controls the setting of the ON state of the charge control transistor 21, for example, based on a signal from the outside of the charge control device 101. Thereby, it is possible to switch whether to set the charging mode of the secondary battery 201 to the direct mode. The outside of the charge control device 101 may be, for example, a device (specifically, a mobile terminal device, an electrical tool, or the like) that receives power supply from the secondary battery 201. Note that The direct control circuit 50 may set the charging mode of the secondary battery 201 to the direct mode when it is detected that the battery voltage of the secondary battery 201 (the output voltage of the charge control transistor 21) is higher than or equal to a predetermined direct mode entering voltage and less than a predetermined direct mode release voltage.

When an overcurrent detection signal by the current limiting circuit 30 is detected in the direct mode, the direct control circuit 50 turns off the switch 93 and turns on the switch 92 so as to release the direct mode. As a result, CC charging by the constant current control circuit 40 is executed. As a result, even if an external power supply 301 whose current output capability is higher than expected is mistakenly connected, because the charging current is limited to the constant current target value of CC-charging as the upper limit, it is possible to prevent the charge control device 101 from failing. In addition, it is possible to prevent an electric current greater than or equal to the rating from flowing into the secondary battery 201, and it is also possible to prevent failure of the secondary battery 201.

The full charge detection circuit 70 is a circuit that detects a full charge of the secondary battery 201. For example, when a charging current that is lower than a predetermined full charge detection current is detected by the current detection circuit 10, the full charge detection circuit 70 outputs a full charge detection signal representing that the full charge of the secondary battery 201 has been detected. The full charge detection circuit 70 outputs, for example, a high level signal representing the full charge detection signal to the charge control circuit 20 via the OR circuit 94. As a result, the gate of the P-channel type charge control transistor 21 in the charge control circuit 20 is turned off, and the output of the charging current from the charge control transistor 21 to the secondary battery 201 is stopped.

Even after the full charge is detected by the full charge detection circuit 70, the recharge detection circuit 80 constantly monitors the battery voltage of the secondary battery 201 when the external power supply 301 is connected. When a battery voltage that is lower than a predetermined recharge detection voltage is detected, the recharge detection circuit 80 determines that the battery voltage of the secondary battery 201 has decreased due to discharging and starts CC charging or CV charging again.

Figure 9:
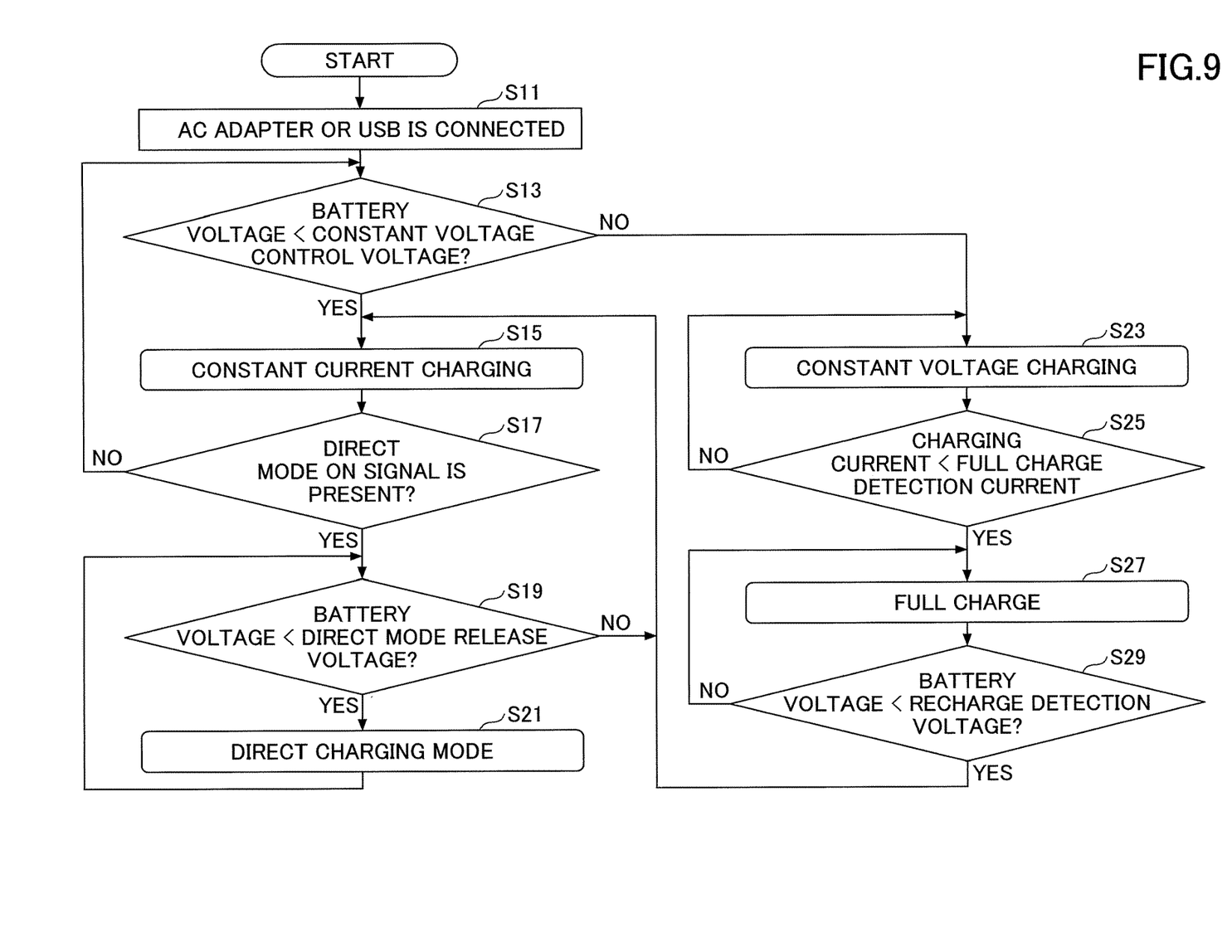
FIG. 9 is a flowchart illustrating an example of a charge control method that is performed in the charging system according to the present embodiment.

FIG. 9 is a flowchart illustrating an example of a charge control method that is performed in the charging system 1000 according to the present embodiment. The method that is illustrated in FIG. 9 will be described with reference to FIGS. 5, 6, and the like.

In step S11, an external power supply 301 such as an AC adapter or a USB device is connected to the charge control device 101.

In step S13, the constant voltage control circuit 60 detects whether the battery voltage of the secondary battery 201 is lower than the constant voltage control voltage Vcv (see, for example, 4.2 V in FIG. 5). When the constant voltage control circuit 60 detects a battery voltage that is lower than the constant voltage control power (YES in step S13), the constant current control circuit 40 CC-charges the secondary battery 201 in the constant current mode (the period before time t3 in FIG. 5) in step S15.

In step S17, the direct control circuit 50 determines whether a direct mode on signal is input. When the input of a direct mode ON signal is not detected by the OR circuit 91, the process of step S13 is executed. On the other hand, when the direct mode ON signal input is detected by the OR circuit 9, the direct control circuit 50 turns on the switch 93 and turns off the switch 92. As a result, because the charge control transistor 21 is set to the ON state, while the charging current rises to the current limit I1, the output voltage of the external power supply 301 decreases to a voltage slightly higher than the battery voltage (time t1 in FIG. 5).

In step S19, the recharge detection circuit 80 detects whether the battery voltage of the secondary battery 201 is lower than the direct mode release voltage Vdm (see FIG. 5, for example, 4.1 V). When a battery voltage that is lower than the direct mode release voltage Vdm is detected by the recharge detection circuit 80 (YES in step S19), charging is performed in the direct mode (period from time t1 to t2 in FIG. 5) in step S21.

On the other hand, when a battery voltage that is equal to or higher than the direct mode release voltage Vdm is detected (NO in step S19), the recharge detection circuit 80 outputs a release command signal representing that the battery voltage is equal to or higher than the direct mode release voltage Vdm. Upon receiving the release command signal from the OR circuit 91, the direct control circuit 50 turns on the switch 92 and turns off the switch 93. By turning off the switch 93, setting of the ON state of the charge control transistor 21 of the charge control circuit 20 is released. By turning on the switch 92, the constant current control circuit 40 controls the gate of the charge control transistor 21 so that the output current of the charge control transistor 21 is a constant current. As a result, in step S15, the constant current control circuit 40 CC-charges the secondary battery 201 in the constant current mode (the period from time t2 to time t3 in FIG. 5).

On the other hand, when it is detected in step S13 that the battery voltage is equal to or higher than the constant voltage control voltage Vcv, the constant voltage control circuit 60 controls the charge control circuit 20 such that the secondary battery 201 is charged with a constant voltage output from the charge control circuit 20 (step S23). That is, the constant voltage control circuit 60 CV-charges the secondary battery 201 (the period from time t3 to time t4 in FIG. 5).

Here, as illustrated in FIG. 5, the direct mode does not immediately transition to CV charging but transitions via CC charging to the CV charging. Through the CC charging, the charging current temporarily decreases from the current limit I1. Therefore, it is possible to prevent the secondary battery 201 from being charged with a relatively high charging current (current limit I1) in a state where the battery voltage is relatively high, and it is possible to prevent deterioration of the secondary battery 201

In step S25, the full charge detection circuit 70 detects whether the charging current is lower than a predetermined full charge detection current Imin (see FIG. 5). When the full charge detection circuit 70 detects a charging current equal to or greater than the full charge detection current Imin (NO in step S25), constant voltage charging by the constant voltage control circuit 60 continues. On the other hand, when the full charge detection circuit 70 detects a charging current less than the full charge detection current Imin (YES in step S25), the full charge detection circuit 70 outputs a full charge detection signal representing that the charging current less than the full charge detection current is Imin detected in step S27. By the output of the full charge detection signal, the charge control transistor 21 is turned off, and charging of the secondary battery 201 is stopped.

In step S29, it is detected whether the battery voltage is lower than a recharge detection voltage. The recharge detection voltage is set to be a voltage (for example, 3.9 V) that is lower than the direct mode release voltage Vdm. When the battery voltage that is higher than the recharge detection voltage is detected by the recharge detection circuit 80, the full charge state continues. On the other hand, when the recharge detection circuit 80 detects a battery voltage that is lower than the recharge detection voltage, the recharge detection circuit 80 outputs a recharge detection signal representing that the battery voltage that is lower than the recharge detection voltage is detected. The constant current control circuit 40 CC-charges the secondary battery 201 (step S15).

Figure 10:
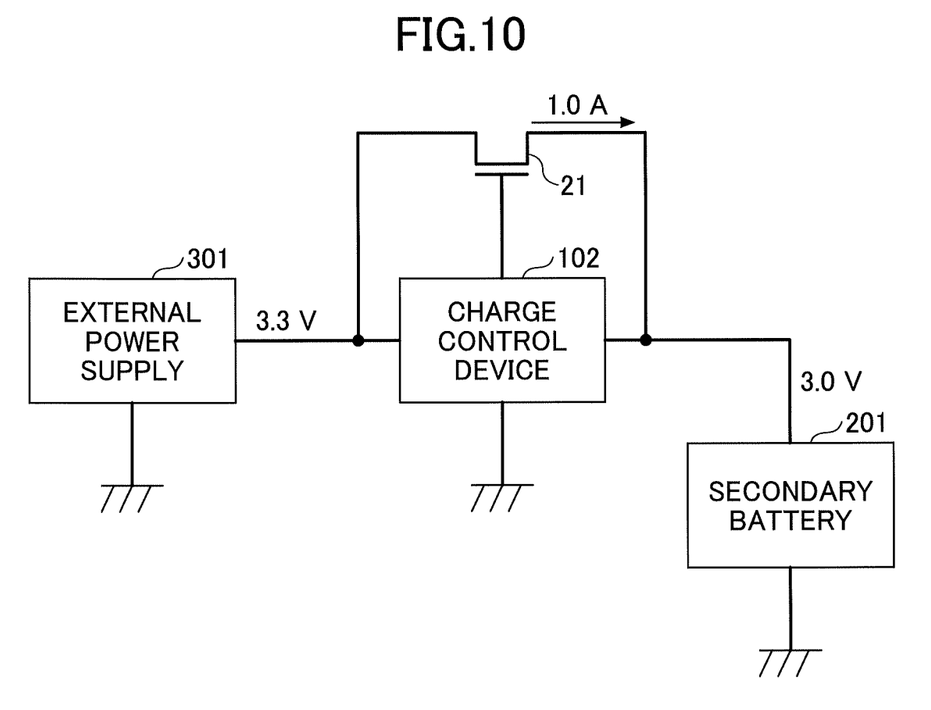
FIG. 10 is a diagram illustrating a variation example of the charging system according to the present embodiment.

FIG. 10 is a diagram illustrating a variation example of the charging system according to the present embodiment. In order to provide versatility to a charge control device 102, the charge control transistor 21 that is turned on in the direct mode may be provided outside the charge control device 102. The configuration of the charge control device 102 may be the same as that of the charge control device 101 except that the charge control transistor 21 is externally attached.

As described above, according to the present embodiment, by setting the charge control transistor 21 to the ON state, the voltage between the input and the output of the charge control transistor 21 decreases due to the current limit function of the external power supply 301. Therefore, even when the secondary battery is charged with a relatively large charging current, the power consumption of the charge control device can be suppressed. Also, because the charge control device is equipped with a control function of CV charging, it is possible to prevent the secondary battery from falling into an overcharge state. Also, by using a current limiting protective function, no overcurrent flows into the secondary battery.

Although the charge control devices, the charging systems, and the charge control method have been described above with reference to the embodiment, the present invention is not limited to the above described embodiment. It should be understood that the various changes, substitutions, combinations, and alterations could be made hereto without departing from the spirit and scope of the invention. Also, all or part the above described embodiment may be combined with another embodiment.

What is claimed is:

1. A charge control device for controlling charging of a secondary battery by using a current limit function of an external power supply, the charge control device comprising:
   a charge control transistor arranged to be connected in series between the external power supply and the secondary battery;
   a constant current control unit configured to control an output current of the charge control transistor to be constant,
   a constant voltage control unit configured to control an output voltage of the charge control transistor to be constant;
   an ON state setting unit configured to monitor a voltage of the secondary battery and to set the charge control transistor to an ON state that is an operation mode to turn on the charge control transistor at a low resistance in order to cause the current limit function of the external power supply to operate, and a full charge detection unit configured to stop an operation of the charge control transistor when a current lower than a predetermined full charge detection current is detected, wherein when the voltage of the secondary battery lower than a predetermined recharge detection voltage is detected at a time of decreasing the voltage of the secondary battery, the ON state setting unit is configured to set the charge control transistor to the ON state, wherein when the voltage of the secondary battery greater than or equal to a release voltage, which is set to be higher than the recharge detection voltage, is detected at a time of increasing the voltage of the secondary battery, the ON state setting unit is configured to release the ON state of the charge control transistor;

wherein when the voltage of the secondary battery lower than the recharge detection voltage is detected after full charge is detected by the full charge detection unit, the ON state setting unit is configured to determine that the voltage of the secondary battery is decreased due to discharge and to again set the charge control transistor to a charge operation state, wherein setting of the ON state of the charge control transistor is released from when the full charge is detected to when the voltage of the secondary battery lower than the recharge detection voltage is detected, and wherein the charge control transistor includes a control terminal to which a control signal for controlling the output current and the output voltage is input, and is composed of a single output transistor.

2. The charge control device according to claim 1, wherein when the output voltage that is equal to or higher than a predetermined release voltage is detected, the operation mode set by the ON state setting unit is released and the output current is controlled to be constant by the constant current control unit.

3. The charge control device according to claim 2, wherein when the output voltage that is equal to or higher than a predetermined constant voltage control voltage is detected, control transitions from control by the constant current control unit to control by the constant voltage control unit.

4. The charge control device according to claim 1, wherein the ON state setting unit controls setting of the operation mode based on a signal from outside the charge control device.

5. The charge control device according to claim 1, further comprising:
a backflow prevention circuit configured to prevent an electric current from flowing from the secondary battery via the charge control transistor to the external power supply.

6. A charging system comprising:
a secondary battery,
an external power supply having a current limit function; and
a charge control device configured to control charging of the secondary battery by using the current limit function,
wherein the charge control device includes
a charge control transistor connected in series between the external power supply and the secondary battery;
a constant current control unit configured to control an output current of the charge control transistor to be constant;
a constant voltage control unit configured to control an output voltage of the charge control transistor to be constant;
an ON state setting unit configured to monitor a voltage of the secondary battery and to set the charge control transistor to an ON state that is an operation mode to turn on the charge control transistor at a low resistance in order to cause the current limit function of the external power supply to operate, and
a full charge detection unit configured to stop an operation of the charge control transistor when a current lower than a predetermined full charge detection current is detected, wherein when the voltage of the secondary battery lower than a predetermined recharge detection voltage is detected at a time of decreasing the voltage of the secondary battery, the ON state setting unit is configured to set the charge control transistor to the ON state, wherein when the voltage of the secondary battery greater than or equal to a release voltage, which is set to be higher than the recharge detection voltage, is detected at a time of increasing the voltage of the secondary battery, the ON state setting unit is configured to release the ON state of the charge control transistor, wherein when the voltage of the secondary battery lower than the recharge detection voltage is detected after full charge is detected by the full charge detection unit, the ON state setting unit is configured to determine that the voltage of the secondary battery is decreased due to discharge and to again set the charge control transistor to a charge operation state, wherein setting of the ON state of the charge control transistor is released from when the full charge is detected to when the voltage of the secondary battery lower than the recharge detection voltage is detected, and wherein the charge control transistor includes a control terminal to which a control signal for controlling the output current and the output voltage is input, and is composed of a single output transistor.

7. A charge control method for controlling charging of a secondary battery by using a current limit function of an external power supply, the method comprising:
controlling an output current of a charge control transistor, which is arranged to be connected in series between the external power supply and the secondary battery, to be constant;
controlling an output voltage of the charge control transistor to be constant; and
monitoring a voltage of the secondary battery and setting the charge control transistor to an ON state that is an operation mode to turn on the charge control transistor at a low resistance in order to cause the current limit function of the external power supply to operate, and
stopping an operation of the charge control transistor when a current lower than a predetermined full charge detection current is detected, wherein when the voltage of the secondary battery lower than a predetermined recharge detection voltage is detected at a time of decreasing the voltage of the secondary battery, the charge control transistor is set to the ON state, wherein when the voltage of the secondary battery greater than or equal to a release voltage, which is set to be higher than the recharge detection voltage, is detected at a time of increasing the voltage of the secondary battery, the ON state of the charge control transistor is released, wherein when the voltage of the secondary battery lower than the recharge detection voltage is detected after full charge is detected, it is determined that the voltage of the secondary battery is decreased due to discharge and the charge control transistor is again set to a charge operation state, wherein setting of the ON state of the charge control transistor is released from when the full charge is detected to when the voltage of the secondary battery lower than the recharge detection voltage is detected, and wherein the charge control transistor includes a control terminal to which a control signal for controlling the output current and the output voltage is input, and is composed of a single output transistor.

* * * * *